July 16, 1929. J. H. ST. H. MAWDSLEY 1,721,348
MEANS FOR THE GENERATION OF ELECTRIC CURRENT FOR ELECTRIC WELDING
Filed Aug. 20, 1928
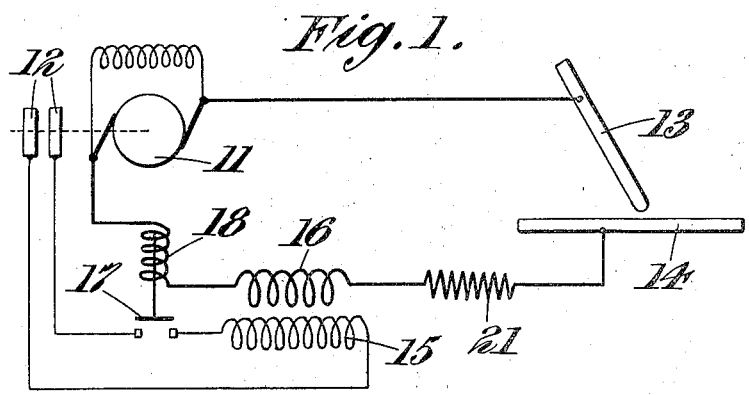
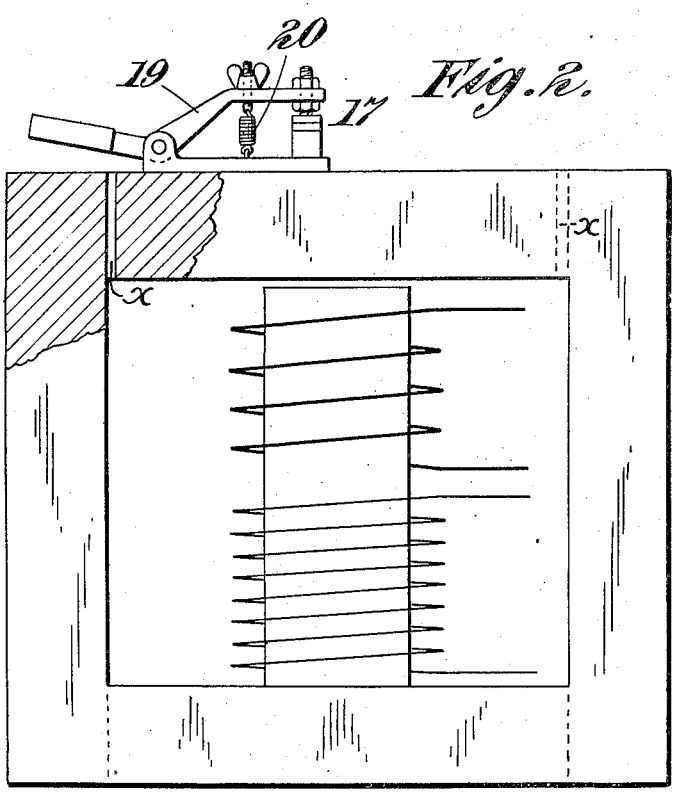

Patented July 16, 1929.

1,721,348

UNITED STATES PATENT OFFICE.

JOHN HERBERT ST. HILL MAWDSLEY, OF BARNWOOD, NEAR GLOUCESTER, ENGLAND.

MEANS FOR THE GENERATION OF ELECTRIC CURRENT FOR ELECTRIC WELDING.

Application filed August 20, 1928, Serial No. 300,806, and in Great Britain June 13, 1928.

It is well known in the welding of objects by electric current that it is necessary first to strike the arc between the two electrodes, one electrode constituting the object to be welded, and then to maintain the arc. It is also well known that the voltage of the supply during the striking of the arc must be higher than that employed during welding.

Various arrangements have been proposed to obtain the necessary reduction in voltage.

The object of the invention is to employ in conjunction with a dynamo-electric machine, a transformer whose secondary winding is connected permanently in series with the welding circuit and whose primary circuit is opened when the arc is struck.

The invention also has for object to use the secondary winding of the transformer as a reactance or choke.

The invention further has for object to enable the primary circuit of the transformer to be opened and maintained open by the leakage flux of the transformer.

In order that the invention, the objects of which have been set forth, may be particularly described and ascertained, reference will now be made to the accompanying drawings, on which:—

Fig. 1 is a diagram, and

Fig. 2 illustrates diagrammatically the transformer.

Figure 3 is a plan view of the transformer iron.

The dynamo-electric generator is shown as a shunt excited machine and has only one armature, the winding on which is connected both with the commutator 11 and with the slip rings 12. Instead of a shunt excited machine, a compound wound machine may be used. The commutator 11 is connected with the movable electrode 13 and with the work 14, which constitutes the other electrode. The slip rings 12 are connected with the primary winding 15 of a transformer, the secondary winding of which is connected permanently in series with the welding circuit. In the circuit of the primary winding 15 of the transformer is a switch 17 which is opened electromagnetically when the arc has been struck. The operating coil 18 of the switch is energized by the direct current supply or the switch 17 is mounted on the transformer and is operated by leakage flux as shown in Fig. 2 in which the movable contact is carried by a pivotally mounted arm 19. 20 is a spring which acts on the arm 19 and tends to close the switch when the arm 19, which is of magnetic material, is not subject to the action of the magnetic flux of the transformer.

The secondary winding 16 of the transformer can carry the full welding current. The secondary winding of the transformer constitutes a reactance or choke, and the transformer has a magnetic circuit such that one portion is saturated with a comparatively small current through the secondary winding as illustrated in Fig. 3 of the drawings wherein it will be seen that the central member of the iron has cut away portions at each of its ends to provide spaces $x$ with projections $a$ at each end of the spaces which projections are in contact with the vertical members. The cross section of these projections $a$ being so much less than that of the limbs these parts are saturated. 21 is a balancing resistance.

What I claim is:—

1. Means for the generation of electric current for electric welding comprising a dynamo-electric generator having its armature winding connected to a commutator and to a pair of slip rings, a welding circuit in connection with the commutator, a transformer having its primary winding connected with the slip rings, and its secondary winding permanently connected in series with the welding circuit, a switch to open the primary circuit of the transformer, and automatic operating means for said switch actuated by the welding current.

2. Means for the generation of electric current for electric welding as claimed in claim 1, wherein the switch controlling the circuit fed from the slip rings is actuated by the leakage flux of the transformer included therein.

Dated this 2nd day of August, 1928.

JOHN HERBERT ST. HILL MAWDSLEY.